United States Patent
Ivanov et al.

(10) Patent No.: US 7,742,641 B2
(45) Date of Patent: Jun. 22, 2010

(54) CONFIDENCE WEIGHTED CLASSIFIER COMBINATION FOR MULTI-MODAL IDENTIFICATION

(75) Inventors: Yuri Ivanov, Arlington, MA (US); Thomas R. Serre, Cambridge, MA (US)

(73) Assignee: Honda Motor Co., Ltd., Tokyo (JP)

( * ) Notice: Subject to any disclaimer, the term of this patent is extended or adjusted under 35 U.S.C. 154(b) by 1206 days.

(21) Appl. No.: 11/293,465

(22) Filed: Dec. 2, 2005

(65) Prior Publication Data

US 2006/0120609 A1 Jun. 8, 2006

Related U.S. Application Data

(60) Provisional application No. 60/633,997, filed on Dec. 6, 2004, provisional application No. 60/634,383, filed on Dec. 7, 2004.

(51) Int. Cl.
*G06K 9/62* (2006.01)
*G06K 9/46* (2006.01)
*G06K 9/66* (2006.01)

(52) U.S. Cl. .................................. 382/224; 382/190
(58) Field of Classification Search ................. 382/190, 382/224
See application file for complete search history.

(56) References Cited

U.S. PATENT DOCUMENTS

| | | | | |
|---|---|---|---|---|
| 5,519,786 A * | 5/1996 | Courtney et al. | ............ | 382/159 |
| 5,537,488 A * | 7/1996 | Menon et al. | ............... | 382/170 |
| 6,611,206 B2 | 8/2003 | Milanski et al. | | |
| 2005/0047664 A1* | 3/2005 | Nefian et al. | ................ | 382/228 |
| 2005/0175167 A1* | 8/2005 | Yacoub et al. | ......... | 379/265.13 |
| 2005/0286772 A1* | 12/2005 | Albertelli | .................... | 382/224 |

OTHER PUBLICATIONS

Kapoor, A.; Picard, R.W.; Ivanov, Y.; "Probabilistic combination of multiple modalities to detect interest" Proceedings of the 17th International Conference on Pattern Recognition, 2004. ICPR 2004. vol. 3, Aug. 23-26, 2004 969-972.*

D. M. J. Tax, M. V. Breukelen, R. P. W. Duin, and J. Kittler, "Combining Multiple Classifiers by Averaging or by Multiplying?", Pattern Recognition 33:1475-1478, 2000.*

Josef Kittler, Mohamad Hatef, Robert P.W. Duin, Jiri Matas, "On Combining Classifiers," IEEE Transactions on Pattern Analysis and Machine Intelligence, vol. 20, 1998, 226-239.*

(Continued)

*Primary Examiner*—Samir A Ahmed
*Assistant Examiner*—Li Liu
(74) *Attorney, Agent, or Firm*—Fenwick & West LLP; Mark E. Duell (57) ABSTRACT

Techniques are disclosed for multi-modal identification that utilize a classifier combination framework. One embodiment of the present invention provides a multi-modal identification system that includes a collection of classifiers that classify feature streams derived from audio and/or video sources. A classifier combination scheme is used to combine the classifier outputs having varying degrees of confidence, but in a robust way by using a confidence-based weighting scheme that operates on a "per-class" basis, rather than (or in addition to) the traditional "per-classifier" basis. The system can be distributed across several machines running independent feature classifiers on the subscription basis.

18 Claims, 6 Drawing Sheets

OTHER PUBLICATIONS

PCT International Search Report and Written Opinion, PCT/US05/43823, Nov. 13, 2006, 6 pages.

Ivanov, Y. et al., Using Component Features for Face Recognition, May, 2004, [online], [Retrieved on Feb. 21, 2006]. Retrieved from the Internet:URL<http://web.mit.edu/serre/www/publications/ivanov_etal-FG04.pdf>, pp. 1-6.

Bilmes, J.A. et al., Generalized Rules for Combination and Joint Training of Classifiers, Pattern Anal Applic, 2003, [online], [Retrieved on Feb. 18, 2006]. Retrieved from the Internet: URL<http://ssli.ee.washington.edu/people/katrin/Papers/bilmes-kirchhoff-paa.pdf>, pp. 201-211.

Confusion Matrix, [online], [Retrieved on Feb. 18, 2006]. Retrieved from the Internet:URLhttp://www2.cs.uregina.ca/~hamilton/courses/831/notes/confusion_matrix/confusion_matrix.html, pp. 1-2.

Duch, Wlodzislaw, Computational Intelligence: Methods and Applications, Lecture 12 Bayesian decisions: foundation of learning, [online], [Retrieved on Feb. 18, 2006]. Retrieved from the Internet:URL<http://www.phys.uni.torun.pl/~duch/Wyklady/CIS/CIS-12.ppt>.

Ghahramani, Zoubin et al., Bayesian Classifier Combination, Sep. 8, 2003, [online], [Retrieved on Feb. 18, 2006]. Retrieved from the Internet:URL<http://www.gatsby.ucl.ac.uk/~zoubin/papers/GhaKim03.pdf>, pp. 1-10.

Glossary of Terms Journal of Machine Learning, Kluwer Academic Publishers, 1998 [online], [Retrieved on Feb. 18, 2006]. Retrieved from the Internet: URL<http://ai.stanford.edu/~ronnyk/glossary.html>, pp. 1-4.

Aksoy, Selim, Introduction to Pattern Recognition Part II, Summer 2005, [online], [Retrieved on Feb. 18, 2006]. Retrieved from the Internet:URL<http://retina.cs.bilkent.edu.tr/papers/patrec_tutorial2.pdf>, pp. 1-54.

Kapoor, Ashish et al., Probabilistic Combination of Multiple Modalities to Detect Interest, [online], [Retrieved on Feb. 18, 2006]. Retrieved from the Internet<URL: http://affect.media.mit.edu/projectpages/multimodal/icpr04.pdf>.

Kirchhoff, Katrin, et al., Dynamic Classifier Combination in Hybrid Speech Recognition Systems Using Utterance-Level Confidence Values, [online], [Retrieved on Feb. 18, 2006]. Retrieved from the Internet:URL<http://ssli.ee.washington.edu/people/katrin/Papers/ICASSP99.ps>.

Kittler, J., et al., Weighting Factors in Multiple Expert Fusion, 1997, [online], [Retrieved on Feb. 18, 2006]. Retrieved from the Internet: URL<http://www.bmva.ac.uk/bmvc/1997/papers/098/draft2.html>.

MCS 2005 Sixth Annual Workshop on Multiple Classifier Systems, [online], [Retrieved on Feb. 18, 2006]. Retrieved from the Internet: URL<http://www.diee.unica.it/mcs/>.

ROC Graph, [online], [Retrieved on Feb. 18, 2006] Retrieved from the Internet:URL<http://www2.cs.uregina.ca/~hamilton/courses/831/notes/ROC/ROC.html>, pp. 1-2.

\* cited by examiner

CONFIDENCE WEIGHTED CLASSIFIER COMBINATION FOR MULTI-MODAL IDENTIFICATION

RELATED APPLICATIONS

This application claims the benefit of U.S. Provisional Application Nos. 60/633,997, filed Dec. 6, 2004, titled "Using Component Features for Face Recognition" and 60/634,383, filed Dec. 7, 2004, titled "Error Weighted Classifier Combination for Multi-modal Human Identification." Each of these applications is herein incorporated in its entirety by reference.

FIELD OF THE INVENTION

The invention relates to identification systems, and more particularly, to techniques for performing multi-modal identification using a confidence weighted classifier combination.

BACKGROUND OF THE INVENTION

Multi-modal identification systems have been growing in popularity over the years, particularly for their relevance to applications in-unconstrained environments (e.g., robotics or video surveillance). Multi-modal refers to multiple sources of data from which identification can be made. The sources of data can be different features of an entity to be identified.

For example, a person can be identified by a number of features, including face, height, body shape, gait, voice, etc. However, the features are not equal in their overall contribution to identifying a person. For instance, face and voice features can be highly discriminative in the identification process, while other features, such as gait or body shape are only mildly discriminative. Even though high recognition rates can be achieved when classifying more discriminative features, such features are typically observed relatively rarely. For example, in a surveillance video sequence the face image can only be used if the person is close enough and is facing the camera. Similarly, a person's voice can only be used when the person actually speaks. In contrast, less discriminative features tend to be plentiful.

In pattern recognition, multiple classifiers can be used in order to improve the recognition rate of a given classification system. Many comparisons have been made between alternative combination rules, such as sum and product rules. In particular, the product rule is optimal when the classifiers in the ensemble are correlated, while the sum (or mean) rule is preferred if they are not. Rank order statistics rules (e.g., min/max) are more robust to outliers than the sum rule, but typically do not offer as much improvement over the error variance.

What is needed, is a multi-modal identification system that utilizes a classifier combination framework.

SUMMARY OF THE INVENTION

One embodiment of the present invention is a method for multi-class classifier combination using predictions of a plurality of multi-class classifiers. The method includes weighting each multi-class classifier prediction in accordance with a per-class weighting scheme, and combining the weighted predictions from two or more multi-class classifiers into a joint prediction. The method may further include the preliminary steps of generating feature streams including at least one audio stream and one video stream from a target scene, classifying a first target feature captured in at least one feature stream using a first multi-class classifier, and classifying a second target feature captured in at least one feature stream using a second multi-class classifier. In one such case, generating feature streams is triggered in response to detecting a target entity being present in the target scene. The method may include storing feature streams, and generating and storing a record for each feature stream including at least one of a time stamp, a file name, recording conditions, and current system parameters in the storage. In one particular configuration, the per-class weighting scheme is based on using a confidence measure to weigh each classifier output, the confidence measure derived from a confusion matrix that represents an empirical value of the distribution of intrinsic error of the classifier on a given data set. In another particular configuration, the per-class weighting scheme is calculated in accordance with $$P_s \approx \sum_\lambda w_\lambda \left[ \sum_{\tilde\omega} P_\lambda(\omega|\tilde\omega) P_\lambda(\tilde\omega|x) \right],$$

where $P_S$ is the joint prediction, x is a set of features in a given scene, $P_\lambda(\tilde\omega|x)$ is the prediction of the individual classifier, $w_\lambda$ is a per-classifier weight, and confidence measure, $P_\lambda(\omega|\tilde\omega,x)$, is approximated by its projection, $P_\lambda(\omega|\tilde\omega)$. In another particular configuration, the per-class weighting scheme is calculated in accordance with $$P_P(\omega|x) = \frac{1}{Z} \prod_\lambda \left[ \sum_{\tilde\omega} P_\lambda(\omega|\tilde\omega) P_\lambda(\tilde\omega|x) \right],$$

where $P_p$ is the joint prediction using a product combination rule, x is a set of features in a given scene, $P_\lambda(\tilde\omega|x)$ is the prediction of the individual classifier, Z is a normalizing constant, and confidence measure, $P_\lambda(\omega|\tilde\omega,x)$, is approximated by its projection, $P_\lambda(\omega|\tilde\omega)$. In another particular configuration, the method may include the preliminary steps of training at least one of the multi-class classifiers on a subset of training data, and computing a confidence measure based on the remaining subset of the training data. In such a case, the per-class weighting scheme further includes weighting the at least one classifier output by the resulting confidence measure. The combining classifier predictions can be carried out, for example, using at least one of voting, sum of outputs, and product of outputs combination rules.

Another embodiment of the present invention provides a machine-readable medium (e.g., compact disk, diskette, server, memory stick, or hard drive) encoded with instructions, that when executed by a processor, cause the processor to carry out a multi-class classifier combination process using predictions of a plurality of multi-class classifiers. This process can be, for example, similar to or a variation of the previously described method.

Another embodiment of the present invention is a multi-class classifier combination system. The system includes a plurality of multi-class classifiers, each classifier for classifying a target feature captured in at least one feature stream. The system further includes a combination module for combining classifier outputs into a joint prediction, wherein each multi-class classifier prediction is weighted in accordance with a per-class weighting scheme prior to combining. The system may also include a data logging subsystem for generating feature streams including at least one audio stream and one video stream from a target scene. In one such case, the data logging subsystem includes a detector that triggers generation of feature streams in response to detecting a target entity being present in the target scene. The system may include a labeling subsystem for labeling stored feature streams accessible to the system, in accordance with a user selected labeling scheme. The system may include a storage for storing feature streams, and a database manager for generating and storing for each feature stream a record including at least one of a time stamp, a file name, recording conditions, and current system parameters in the storage. In one particular configuration, a classifier is trained on a subset of training data, and then a confidence measure is computed based on the remaining subset of the training data, and the per-class weighting scheme carried out by the combination module includes weighting the classifier output by the resulting confidence measure. In another particular configuration, the per-class weighting scheme carried out by the combination module is based on using a confidence measure to weigh each classifier output, the confidence measure derived from a confusion matrix that represents an empirical value of the distribution of intrinsic error of the classifier on a given data set. In another particular configuration, the per-class weighting scheme carried out by the combination module is in accordance with $$P_S \approx \sum_\lambda w_\lambda \Big[ \sum_{\tilde{\omega}} P_\lambda(\omega|\tilde{\omega}) P_\lambda(\tilde{\omega}|x) \Big],$$

where $P_S$ is the joint prediction, x is a set of features in a given scene, $P_\lambda(\tilde{\omega}|x)$ is the prediction of the individual classifier, $w_\lambda$ is a per-classifier weight, and confidence measure, $P_\lambda(\omega|\tilde{\omega},x)$, is approximated by its projection, $P_\lambda(\omega|\tilde{\omega})$. In another particular configuration, the per-class weighting scheme carried out by the combination module is in accordance with $$P_P(\omega|x) = \frac{1}{Z} \prod_\lambda \Big[ \sum_{\tilde{\omega}} P_\lambda(\omega|\tilde{\omega}) P_\lambda(\tilde{\omega}|x) \Big],$$

where $P_p$ is the joint prediction using a product combination rule, x is a set of features in a given scene, $P_\lambda(\tilde{\omega}|x)$ is the prediction of the individual classifier, Z is a normalizing constant, and confidence measure, $P_\lambda(\omega|\tilde{\omega},x)$, is approximated by its projection, $P_\lambda(\omega|\tilde{\omega})$. The combination module can combine classifier outputs, for example, using at least one of voting, sum of outputs, and product of outputs combination rules.

The system functionality can be implemented, for example, in software (e.g., executable instructions encoded on one or more computer-readable mediums), hardware (e.g., gate level logic), firmware (e.g., one or more microcontrollers with embedded routines), or some combination thereof, or other suitable means.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques are disclosed for multi-modal identification that utilize a classifier combination framework.

General Overview

As previously explained, even though high recognition rates can be achieved (using conventional identification techniques) when classifying more discriminative features (e.g., face and voice), in reality such features are observed only relatively rarely. In contrast, there is a plentiful supply of the less discriminative features (e.g., height, body shape, and gait). Multi-modal identification that utilizes a classifier combination framework can be used to extract identification value from the less discriminative or otherwise unusable features, in accordance with various embodiments of the present invention.

Figure 1:
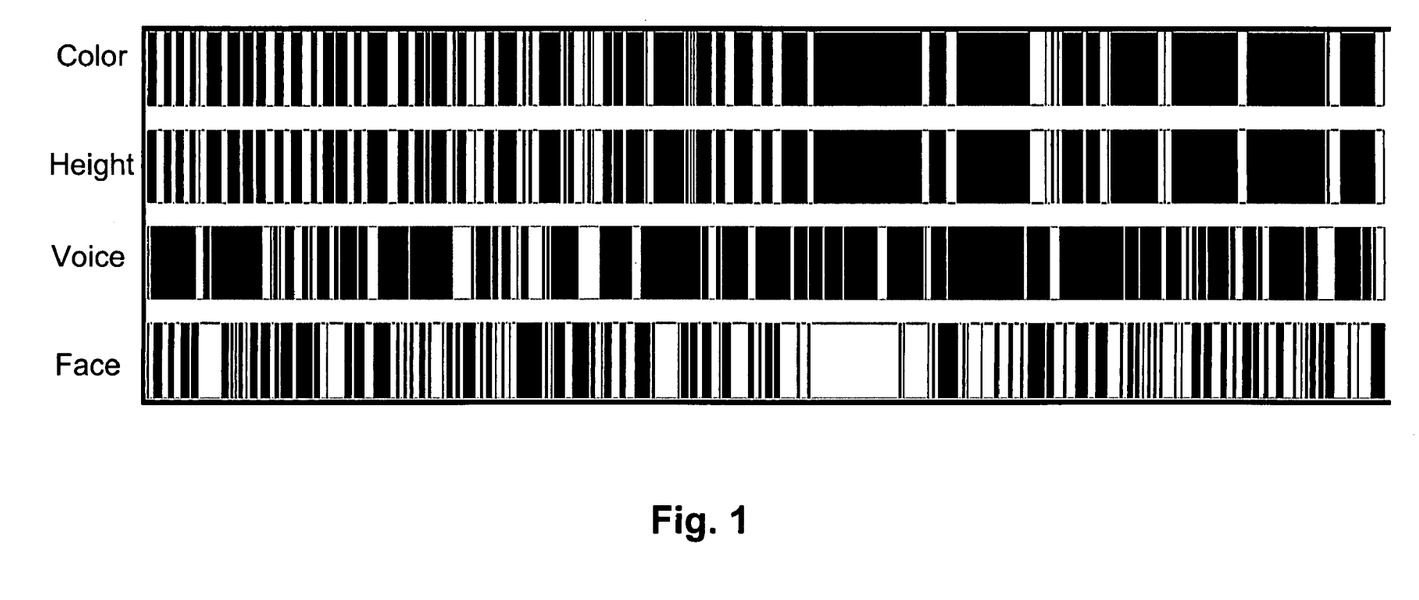
FIG. 1 illustrates a collection of audio and video feature streams extracted from a video clip and aligned in time, where the presence of the feature in the stream is indicated by color.

The application of a classifier combination scheme to a multi-modal input from an autonomous target entity (e.g., person or system) is associated with a number of non-trivial challenges. FIG. 1, which shows a collection of audio and video features extracted from a video clip of a person, demonstrates some of these challenges. In more detail, FIG. 1 shows the feature streams aligned in time, where the presence of the feature in the stream is indicated by color. As can be seen, the joint occurrence of the features in all streams simultaneously is a relatively rare event. However, at least one feature is present at almost every time interval throughout the entire sequence. Therefore, an identification of the person (or other target entity) at almost every time instance can be achieved, albeit with a varied degree of certainty.

One embodiment of the present invention provides a multi-modal identification system that includes a collection of classifiers that classify feature streams derived from audio and/or video sources. A classifier combination scheme is used to combine the classifier outputs having varying degrees of confidence, but in a robust way by using an confidence-based weighting scheme that operates on a "per-class" basis, rather than (or in addition to) the traditional "per-classifier" basis. The weighting scheme recognizes that not all features are present at any given time, but an identity decision still has to be made. The feature streams may include both the more discriminative features and less discriminative features to identify the target entity (e.g., person, vehicle, or other object). In one particular configuration, outputs of individual classifiers are combined within an approximate Bayesian combination framework.

The system can give an identity prediction of the target entity instantaneously, whenever any measurable data becomes available. Thus, at least one prediction is available for almost every frame of video being analyzed. In one particular configuration, the system is distributed across several machines running independent feature classifiers on the subscription basis. This distributed architecture allows for the successful use a heterogeneous network of computers regardless of their architecture and operating system.

The system can be used in numerous applications, as will be apparent in light of this disclosure. For instance, the system can be used in an autonomous robot application, so as to give the robot capability to identify a person with whom the robot is interacting (or other entities with which the robot can interact or otherwise observe). The system utilizes available information in order to identify the target entity in a variety of circumstances, such as when the robot sees the target person's face, when it hears the person's voice, or when it observes only a rough person's silhouette in a dark corner of the room. Likewise, the system can be used in biometric applications, such as online human identification system. In any case, a system is enabled that is capable of identifying a target entity from any information available at any time instant, thereby approaching the persistent performance of the human perceptual system.

System Architecture

Figure 2:
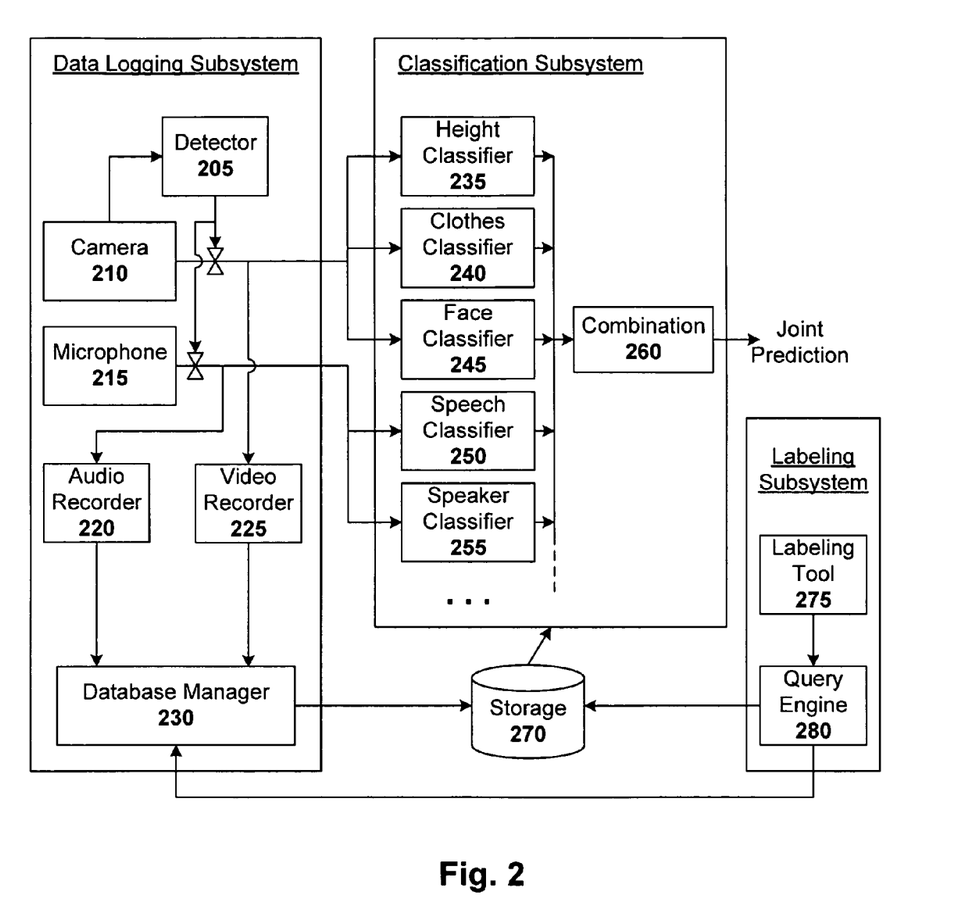
FIG. 2 is a block diagram of a multi-modal identification system configured in accordance with an embodiment of the present invention.

FIG. 2 is a block diagram of a multi-modal identification system configured in accordance with an embodiment of the present invention. The system operates in three modes: data collection, labeling, training and classification modes, each of which will be discussed in turn.

As can be seen, the system includes a data logging subsystem, a classification subsystem, and a labeling subsystem. The system receives its input from a camera 210 and a microphone 215 (e.g., conventional video camera and mid-range wide-pick up microphone). In one embodiment, each of the camera 210 and microphone 215 are statically mounted (e.g., surveillance application). Alternatively, the camera 210 and microphone 215 can be movable (e.g., autonomous robot application). In addition, note that multiple cameras 210 and/or microphones 215 can be used to provide additional input streams. In such an embodiment, each audio/video stream pair can have its own classifier subsystem (as shown in the FIG. 2). Alternatively, the multiple audio/video stream pairs can all use the same classifier subsystem by operation of a fast switching scheme (e.g., digitally switch the audio and/or video streams to the classifier subsystem one at a time), or by a multiplexing scheme (e.g., electronically tag each of the audio and/or video output streams so that the classifier subsystem can distinguish between the multiplexed streams as it serially processes the streams).

The input from the camera 210 is first passed through a detector module 205, which decides if there is a possibility that there is a person or other target entity in the frame. The detector module 205 can achieve this detection by a number of conventional detection means. For instance, the detector 205 can be programmed or otherwise configured to evaluate the aspect ratio of the bounding box of the region with significant motion, and/or to perform a face detection on the region of motion. In one such embodiment, the detector module 205 is configured to perform face detection as described in "Categorization by Learning and Combining Object Parts," by B. Heisele, T. Serre, M. Pontil, T. Vetter, and T. Poggio (in Advances in Neural Information Processing Systems 14, pages 1239-1245, Vancouver, Canada, 2002), which is herein incorporated in its entirety by reference. If one or both of the detection conditions reports success, the detector module 205 triggers the streaming process (e.g., by activating a relay or other switch in each streaming pathway, as shown in FIG. 2).

In the embodiment shown, streaming video clips are recorded by the video recorder 225, and the streaming audio clips are recorded by the audio recorder 220 (e.g., each recorder can be implemented with conventional technology). The recorded clips are then stored into storage 270 (e.g., SQL database or any other storage facility that allows for the storage and retrieval of information) via the database manager 230. In one particular embodiment, at the same time the audio and/or video clips are stored, the database manager 230 generates and stores a record containing a time stamp, a file name, recording conditions, and current system parameters in the storage 270. Each of the database manager 230 and the storage 270 can be implemented with conventional or custom database technology.

Each stream is also passed to a set of feature classifiers included in the classifier subsystem, as shown in FIG. 2. The classifiers are configured to classify the input data captured in the streams by using, for example, the existing class models. Other suitable classification techniques can be used as well. In this particular embodiment, the classifiers are for identifying a person. The set includes a height classifier 235, a clothes classifier 240 and a face classifier 245 (each of which receive the video stream), and a speech classifier 250 and a speaker classifier 255 (each of which receive the audio stream). Each of the classifiers can be implemented with conventional or custom classification techniques.

The output of each classifier is then passed to a combination module 260. In one embodiment, the combination module 260 is programmed or otherwise configured to combine the classifier outputs into a joint prediction using an approximate Bayesian classifier combination technique, as will be described in herein. The classifier predictions form a continuous output of the system, which include the posterior probability distribution over a set of known entities (e.g., such as individuals or other target entities of the system) at every frame of the video. A classifier derived from weakly discriminative features is usually highly inaccurate. This inaccuracy is determined by parameters external to the classifier, such as noisy measurements, or by an intrinsic inadequacy of the chosen method. If, for instance, an individual's height is chosen as a discriminating measure, several people could have approximately the same height, and therefore, look inherently alike to the height classifier 235. An embodiment of the present invention exploits the recognition that the intrinsic inadequacy can be measured from training data and used to subsequently assign a confidence measure which weights the classifier output in combination. Such a technique provides a highly robust identification system, and can be used in combination with audio and video data inputs so that multiple identification opportunities can be presented to the system.

Figure 3:
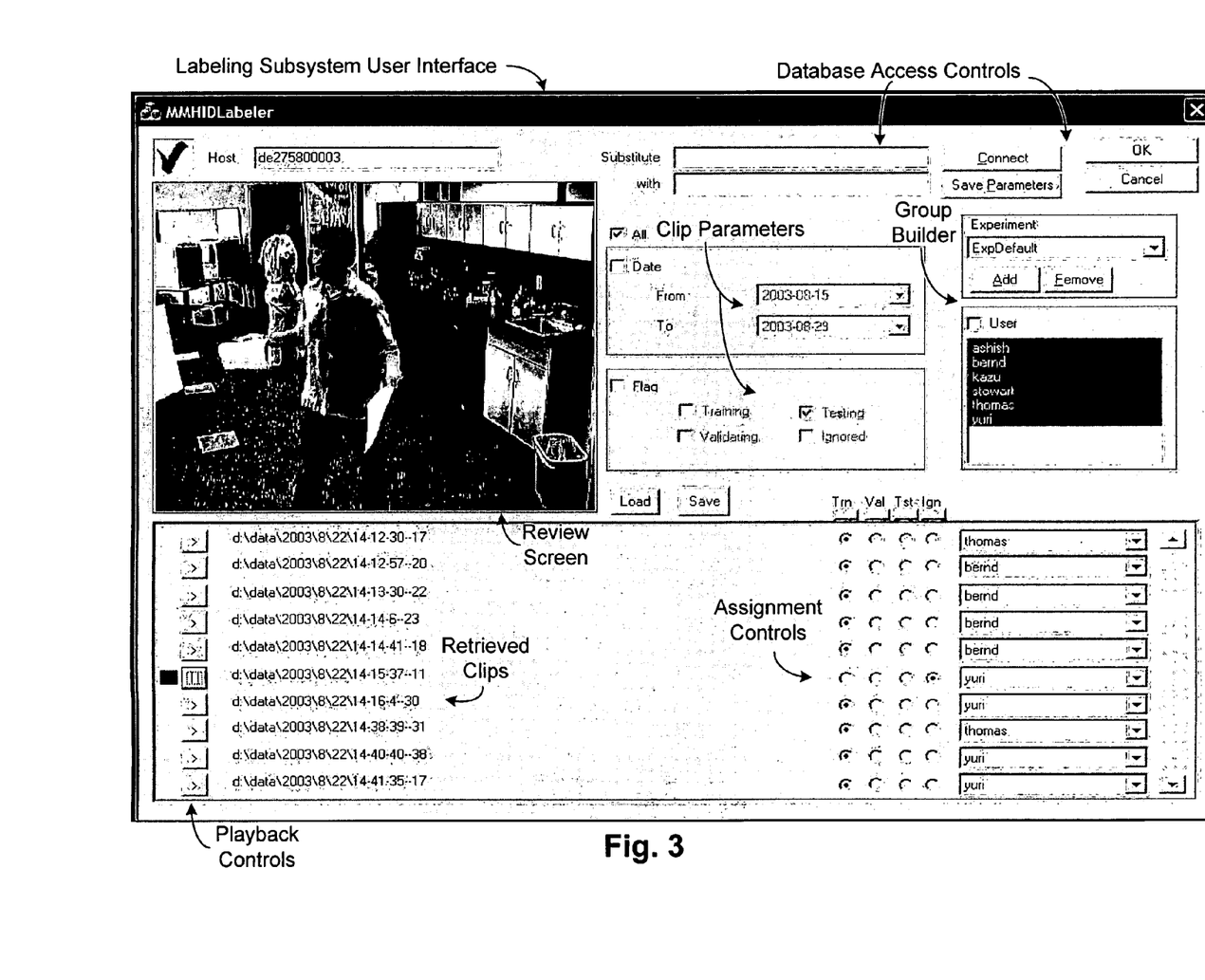
FIG. 3 illustrates a screen shot of the user interface of a labeling subsystem configured in accordance with an embodiment of the present invention.

As the amount of audio and video clips can be large, the clips can be managed and appropriately labeled using the labeling subsystem. FIG. 3a illustrates a screen shot of the user interface (UI) of the labeling subsystem, which runs in conjunction with labeling tool 275 and query engine 280; In the embodiment shown in FIG. 3a, the labeling subsystem allows a user to retrieve and review clips from the storage 270, and to assign them to a particular "experiment" (or other groupings). An experiment or group is a collection of labels for each clip, where a clip can be assigned to be used for training (Tm), testing (Tst), validation (Val), or ignored (Ign).

The group builder and assignment controls of the UI operate in conjunction with the labeling tool 275, thereby allowing the user to build groups of labeled clips, and to assign those clips as desired. The database access controls of the UI operate in conjunction with the query engine 280, as database access UIs typically do. Clip parameters can be defined by the UI so as to access a particular sub-set of the clips stored in the storage 270. For instance, the user can set a date range for target clips to be retrieved. Likewise, the user can set a flag so as to retrieve clips having a particular assignment (train, validation, test, ignore). Once desired clip parameters are set, the load and save control buttons of the UI allow the user to activate the query engine 280 to access the storage 270 and to retrieve the requested clip parameters, and store the retrieved set, if so desired. The retrieved clips are then displayed in the UI, with each clip associated with playback controls. The user can use the playback control to play the clip. Video clips are displayed on the review screen. Numerous known or custom UI and database access techniques can be used to implement the labeling subsystem functionality, and the present invention is not intended to be limited to any one particular configuration (e.g., some embodiments of the present invention will not have a UI).

Confidence-Based Bayesian Classifier Combination

As previously explained, the combination module 260 is configured to combine the classifier outputs into a joint prediction using an approximate Bayesian classifier combination technique, in accordance with an embodiment of the present invention.

Typically, a fully trained classifier misclassifies at least some of the training data. These misclassifications can be reflected in the form of a confusion matrix. The confusion matrix expresses the likeness of the classes from the point of view of the particular classifier, which it is trained to recognize. For instance, the face classifier 245 is trained to recognize various face classes, and the confusion matrix expresses the likeness of those face classes from the point of view of the face classifier 245. The confusion matrix represents an empirical value of the distribution of the intrinsic error of the classifier on the given data set. In accordance with this particular embodiment, the classifier combination carried out by the combination module 260 is based on using the confidence measure derived from the confusion matrix to weigh the output of each classifier before the application of a combination rule.

In more detail, a set of features x in a given scene, represents measurements available from multiple independent observation channels. That is $x=\{x^{\lambda=1}, x^{\lambda=2}, \ldots x^{\lambda=C}\}$, where C is the number of individual feature channels, such as an image of the person's face (from face classifier 245), person's height (from height classifier 235), distribution of colors in the person's clothes (from clothes classifier 240), as well as an audio stream of the person's voice (from speech classifier 250 and the speaker classifier 255). For a given observation set, x, distribution over true class label, $\omega$, can be estimated. Since each classifier in the set uses only a disjoint subset $x^\lambda$ of the features in x, it can be asserted that $\forall \lambda$: $P(\omega|x,\lambda) \equiv P(\omega|x^\lambda,\lambda)$. Then for a full observation, x, the output of the classifier system, $\omega$, can be expressed in terms of a marginal distribution:

$$P(\omega|x) = \sum_\lambda P(\omega, \lambda|x) = \sum_\lambda P(\omega, \lambda|x)P(\lambda|x) \quad \text{(Equation 1)}$$

where $P(\lambda_i|x)$ is the weight assigned to i-th classifier in the combination. In different formulations this term represents an "expert" or a "critic."

In one embodiment of the present invention, the framework for classifier combination implemented by the combination module 260 is based on viewing the output of an individual multi-class classifier as a random variable, $\tilde{\omega}$, which takes values from 1 to K, the number of classes. For instance, assume access to the joint probability of the true and predicted class labels, $P(\omega,\tilde{\omega},x|\lambda_i)$, for each classifier $\lambda_i$. Then, the true label can be inferred from the individual classifier by averaging with respect to the classifier prediction:

$$P(\omega|\lambda, x) = \sum_{\tilde{\omega}} P(\omega, \tilde{\omega}|\lambda, x) = \sum_{\tilde{\omega}} P(\omega|\tilde{\omega}, \lambda, x)P(\tilde{\omega}|\lambda, x) \quad \text{(Equation 2)}$$

where $P(\tilde{\omega}_k|\lambda_i,x)$ is the prediction of the individual classifier. Equation 2 can then be substituted into Equation 1 to arrive at the following:

$$P(\omega|x) = \sum_\lambda \sum_{\tilde{\omega}} P(\omega|\tilde{\omega}, \lambda, x)P(\tilde{\omega}|\lambda, x)P(\lambda|x) \quad \text{(Equation 3)}$$

$$\approx \sum_\lambda \sum_{\tilde{\omega}} P(\omega|\tilde{\omega}, \lambda)P(\tilde{\omega}|\lambda, x)P(\lambda|x)$$

In the last line of Equation 3, the confidence measure, $P(\omega|\tilde{\omega}_k,x\lambda_i)$, which is difficult to obtain, is approximated by its projection, $P(\omega|\tilde{\omega}_k, \lambda_i)$. The latter is an empirical distribution that can be obtained from the confusion matrix of the classifier on a validation subset of the training data. For compactness, the subscript $\lambda$ is used herein to denote the distribution conditioned on $\lambda$. For instance, $P_\lambda(\omega|\tilde{\omega}) \equiv P(\omega|\tilde{\omega},\lambda)$. Additionally, to emphasize its role as a weighting, the prior distribution $P(\lambda|x)$ is denoted by $w_\lambda$.

The essence of Equation 3 is that the prediction of each classifier is weighted in accordance to the error distribution over the classes. Practical implications of this procedure involve multiplying the classifier scores with the confidence measure to obtain the corrected score that takes into account the certainty of the classifier about a particular class. Note that this combination framework should not significantly affect the output of a classifier which is in general accurate, since its confusion matrix will be close to identity. On the other hand, if a classifier systematically mistakes samples of, say, class 1 for samples of class 2, the prediction of the classifier about class 1 will be biased towards class 2 in proportion to the number of mistakes made on the validation set. While a good classifier should not be affected by such an operation, in combination with others, more weight is given to class 2 and it is left to other classifiers to disambiguate this situation. This results in a "per-class" weighting scheme, rather than the traditional "per-classifier" paradigm (i.e., conventional approaches weigh entire classifiers, regardless of their performance on individual classes). Additionally, each classifier is weighted by the term $P(\lambda_i|x)$, which can express external knowledge about the instantaneous performance of each classifier. For instance, if some of the features are not present, the corresponding probabilities can be set to 0 and their outputs subsequently ignored in making the combined decision. A component embodied in $P(\lambda_i|x)$ can be referred to as an arbiter, or a critic.

In summary, an embodiment of the present invention is based on viewing the output of a multi-class classifier as a random variable, $\tilde{\omega}$, which takes values from 1 to K, the number of classes. If the distribution over true class label, $\omega$, given classifier prediction, $\tilde{\omega}$ is available for each classifier, it can be utilized to derive the combination scheme for a set of classifiers. Such distribution can be estimated from testing a classifier on a validation subset of the training data. Then the combination rule can be derived via marginalization of the individual classifier predictions as shown in Equation 3 and further represented in Equation 4:

$$P_s \approx \sum_\lambda w_\lambda \left[ \sum_{\tilde{\omega}} P_\lambda(\omega|\tilde{\omega}) P_\lambda(\tilde{\omega}|x) \right] \qquad \text{(Equation 4)}$$

where $P_\lambda(\tilde{\omega}|x)$ is the prediction of the individual classifier, and $w_\lambda$ is the "per-classifier" weight. The essence of Equation 4 is that prediction of each classifier is weighted in accordance to the confidence that it has for each class. In this Equation 4 the conditional distribution, $P_\lambda(\omega|\tilde{\omega},x)$, is approximated by its projection, $P_\lambda(\omega|\tilde{\omega})$. The latter is an empirical quantity that can be obtained from the confusion matrix. Thus, a method is enabled for weighting the classifier outputs prior to their combination based on the distribution of the empirical error.

This model establishes a general framework for classifier combination, from which a variety of different combination strategies can be derived. Three example strategies for combining the outputs include voting, sum of outputs, and product of outputs. Overall, the product of the outputs may marginally outperform the other two combination strategies. In the paper titled, "Combining Multiple Classifiers by Averaging or by Multiplying?" by D. M. J. Tax, M. V. Breukelen, R. P. W. Duin, and J. Kittler (in Pattern Recognition 33:1475-1478, 2000), a framework is described in which sum and product rules are formally justified. This paper is herein incorporated in its entirety by reference. The confidence-weighted classifier combination techniques described herein are fully compliant with that framework, in that the techniques allow for critic-based (expressed in $w_\lambda$) and error-corrected (induced by $P_\lambda(\omega|\tilde{\omega},x)$) variants of common combination schemes (e.g., sum and product).

A parallel between the combination rule given in Equation 4 and the traditional sum rule $$P(\omega|x) = \frac{1}{C} \sum_\lambda P_\lambda(\tilde{\omega}|x)$$

can be used to form confidence-weighted equivalents of product and voting combination rules. For instance, the weighted product rule is:

$$P_P(\omega|x) = \frac{1}{Z} \prod_\lambda \left[ \sum_{\tilde{\omega}} P_\lambda(\omega|\tilde{\omega}) P_\lambda(\tilde{\omega}|x) \right] \qquad \text{(Equation 5)}$$

where Z is a normalizing constant.

The weighting technique represented in Equations 3, 4, and 5 presumes that class probabilities are available from each classifier. This presents a minor problem when using discriminative models, such as support vector machines (SVMs). In its direct formulation, an SVM does not output probabilities, but rather, values of the discriminant function. However, these values or "scores" can be converted to probabilities by applying to them the softmax function:

$$P(\tilde{\omega}|x) = \frac{\exp(s_{\tilde{\omega}})}{\sum_{\tilde{\omega}} \exp(s_{\tilde{\omega}})} \qquad \text{(Equation 6)}$$

Further, note that using this transformation does not change the classification decision for a minimum error rate classifier, but allows the classifier be treated within the probabilistic framework described herein.

Distributed Multi-Modal Identification System

Figure 4:
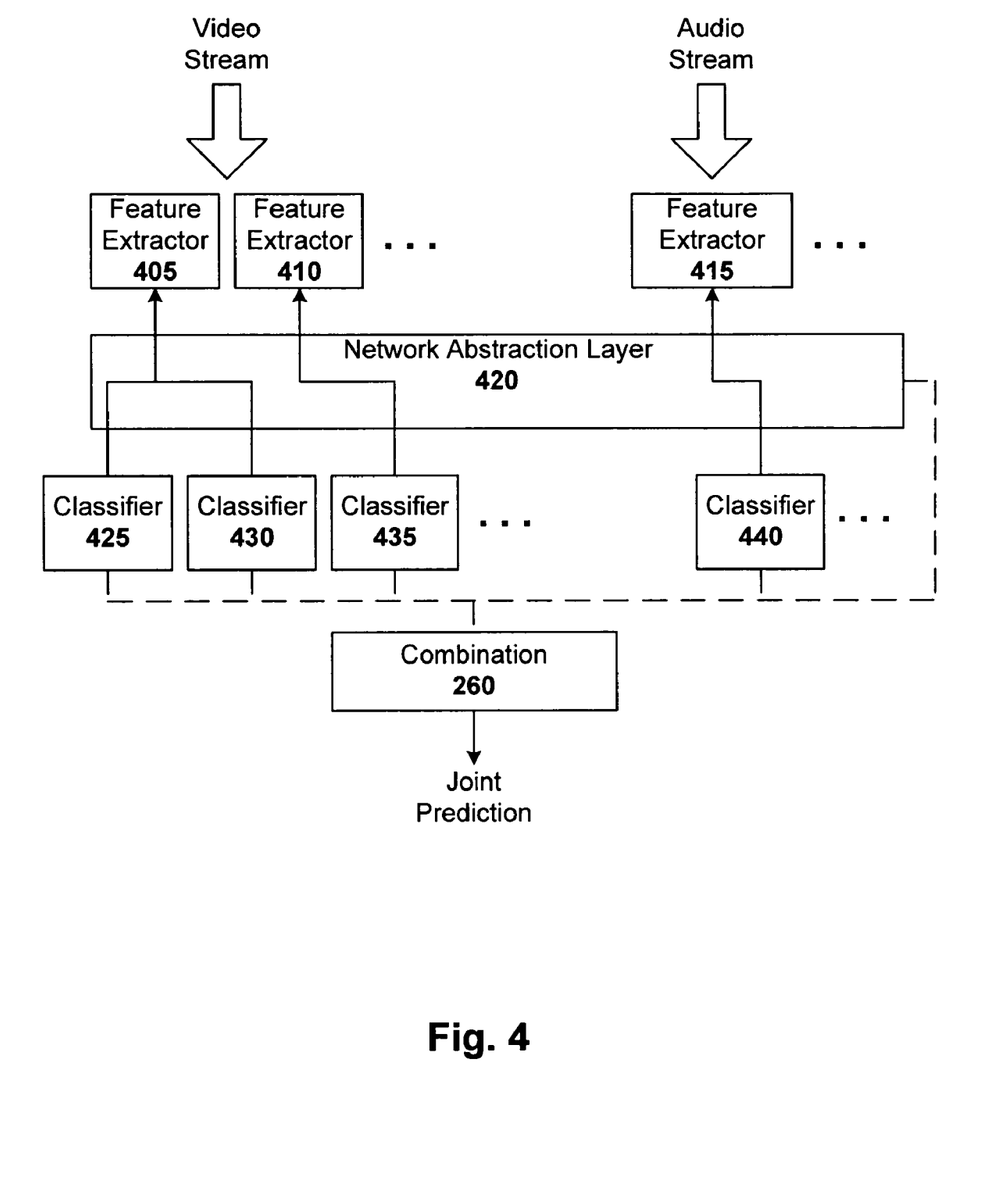
FIG. 4 is a block diagram of distributed multi-modal identification system configured in accordance with an embodiment of the present invention.

FIG. 4 is a block diagram of distributed multi-modal identification system configured in accordance with an embodiment of the present invention. The distributed system is fully scalable, and includes a number of video feature extractors (e.g., 405 and 410) that operate on a video stream input, and a number of audio feature extractors (e.g., 415) that operate on an audio stream input. One or more classifiers are operatively coupled to each feature extractor via a network abstraction layer 420. In this particular embodiment, video feature extractor 405 is coupled to classifiers 425 and 430, video feature extractor 410 is coupled to classifier 435, and audio feature extractor 415 is coupled to classifier 440.

Each classifier (e.g., 425, 430, 435, 440) can be implemented and run, for example, as a plugin module either locally, or on a remote machine, if the need arises. Such a configuration allows an unlimited number of feature classifiers to be trivially inserted into the system even at the runtime. The UI to the system allows the classifiers (e.g., 425, 430, 435, 440) to be run in training, validation and classification modes, where classifiers can be trained and used remotely. The networking architecture of FIG. 4 is based on a "subscription" service.

In more detail, if a subscription request is received by the system for a particular type of feature (e.g., a face region, such as the nose), a corresponding feature extraction module (e.g., 405, 410, 415) is instantiated if not already running. Every time a corresponding feature becomes available (as detected from the audio and/or video input streams), the feature extractor broadcasts that feature to all its subscribers via the network abstraction layer 420. The network abstraction layer 420 can be implemented with conventional networking techniques. In one embodiment, network abstraction layer 420 is implemented using a parallel virtual machine library, such as that described in, "A Users' Guide and Tutorial for Networked Parallel Computing," by A. Geist, A. Beguelin, J. Dongarra, W. Jiang, R. Manchek, and V. Sunderam (in PVM: Parallel Virtual Machine, MIT Press, Cambridge, Mass., 1994), which is herein incorporated in its entirety by reference.

The results from the one or more classifiers are then collected when available and aggregated, by the combination module 260 (e.g., as discussed with reference to FIG. 2). Note that the classifier outputs can be provided to the combination module 260 by the network 420, or by any other suitable means (e.g., direct connections from each classifier to the combination module). This allows the identification system to run at a high frame rate, where the overall output of the system is not affected by computational complexity of each individual classifier in the set.

Figure 5:
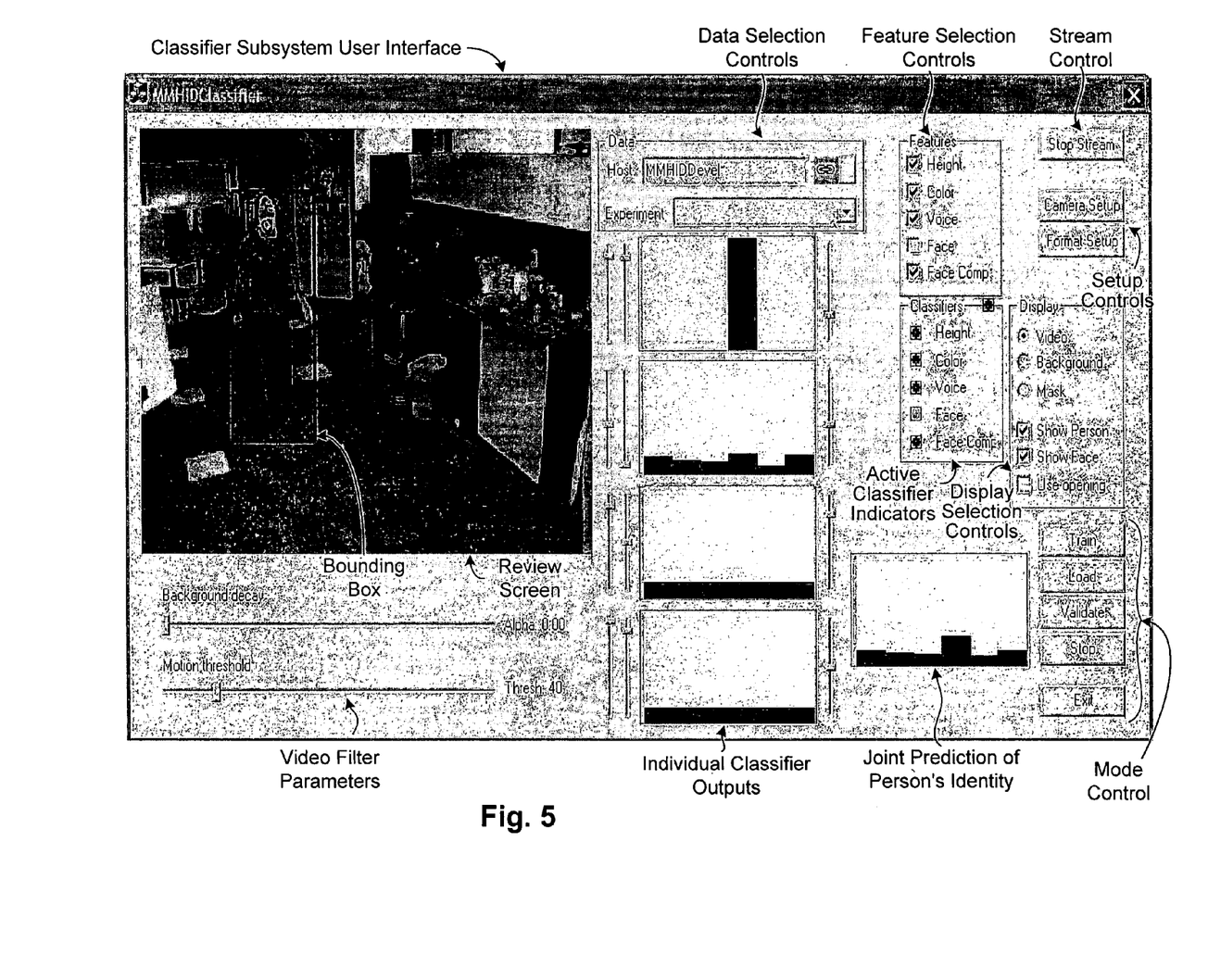
FIG. 5 illustrates a screen shot of the user interface of a run-time classifier subsystem configured in accordance with an embodiment of the present invention.

An example screenshot of a run-time classifier subsystem UI configured in accordance with an embodiment of the present invention is shown in FIG. 5. As previously explained, the classifiers (e.g., 425, 430, 435, and 440) can be run remotely. The data selection controls allow the user to select a host system, as well as an experiment or group of video and/or audio clips that have already been run (e.g., and is stored in storage 270). The system can also run on live inputs, where the clips are classified in real-time. In the example screen shot shown in FIG. 5, the system is in classification mode, and is receiving four feature streams: height, color, voice, and face component (as indicated by the feature selection controls of the UI). The active classifier indicators of the UI allow the user to see which classifiers are active, based on the feature selection controls set by the user. The four bar graphs on the left show the outputs of the individual classifiers corresponding to each of those four user selected features. UI controls (e.g., sliders) can be provided to adjust classifier parameters for optimal performance, as is typically done. The bar graph on the right graphically depicts the joint prediction of the person's identity determined by the combination module 260. The UI further includes a review screen that allows the user to see the clip from which features are being extracted, and video filter parameters (e.g., motion threshold and background decay) that can be adjusted to optimize video quality for analysis purposes. Other UI features, such as stream control, setup control (e.g., camera and format setup), and mode controls (e.g. train, load, validate, stop and exit), allow the user to interact and control the system as desired, as will be understood in light of this disclosure.

Implementation Details

As previously explained, the classification system is configured to work from live input (e.g., from video and/or audio input streams). To evaluate the system, an extended dataset was collected that included training, validation and testing audio and video sequences. The data was collected from six people in an office environment over the course of several weeks. A statically mounted camera (or stereo camera pair) and a long range microphone were used (e.g., the system could be implemented similar to that shown in FIG. 2, deployed in a surveillance setting). As previously explained, features (from the input streams) form several individual channels and are treated independently until the classifier outputs need to be combined by the combination module 260. In this example implementation, the features formed two main groups: features available from audio and features available from video. The target entity in this example is a person captured on both video and audio.

For audio classification, the well known Mel Frequency Cepstral Coefficients (MFCC) were used. The process under which they are obtained is as follows. First, forty Mel Frequency Coefficients (MFCs) are captured at 100 Hz from overlapping sliding windows (frames). Then, a discrete cosine transform (DCT) is applied to the set of MFCs to convert them to Cepstral Coefficients (MFCCs). Only the frames with most of the power in the lower half of the frequency spectrum and having significant energy are tagged as voice features to be included in later classification steps. After obtaining sufficient amount of the audio samples, a Gaussian Mixture-based classifier can be trained on the collected set of Mel-Scale Cepstral Coefficients.

Speaker Classifier 255: In order to classify the person from the auditory features, an 8-component mixture can be used to model a person. This speaker classifier can be trained and tested on collections of MFCCs that have passed the simple power test. In one particular example embodiment, a Gaussian kernel SVM was used to implement the on-line speaker classifier 255.

Speech Classifier 250: In instances when a face is detected but the face classifiers consistently report a low score, the system can be configured to actively prompt the person for their name (or other speech example). If a significant energy is detected in the audio stream within a given window of time (e.g., 2-5 seconds), then it is assumed that the user replied with the name or other speech example. In one embodiment, the sequence of MFCCs corresponding to the user response is taken and matched against a spoken dictionary of several dozen people's names using a simple Dynamic Time Warp sequence matching algorithm. This speech classifier 250 need not be used in the combination at the run time, but instead can be used later by the labeling tool 275 as a tentative label for the corresponding video clip.

For video classification, the extraction of video features begins with detecting a person in the view of the camera. To detect a person, a set of simple rules can be applied, such as: presence of significant motion over at least three or more frames; sufficient and stable illumination conditions; and appropriate aspect ratio of the enclosing bounding box (as shown in FIG. 5); and presence of a face like object within the bounding box. If such conditions are met (as detected by detector 205), recording (by audio recorder 220 and video recorder 225) can be triggered as previously explained. The extracted data is then passed to the appropriate classifiers. To extract the video features, an adaptive background subtraction can be performed, which results in a binary mask. The following technique can be used for isolating a person in the image, and removing the shadows that person might cast on furniture and walls. First, sum the resulting binary mask vertically. In the resulting histogram of the non-zero values, find the peak and expand it outwards until a value below a chosen threshold is encountered. Use this range as an estimate of the horizontal position and extent of the bounding box.

Face Classifier 245: For each frame in the video stream, face detection is performed over a bounding box region. If a person is present, the bounding box containing the object of interest is scanned for a face and, if one is found, a smaller patch enclosing only the face is extracted from the image for classification. With a labeled dataset of faces of K people, the K one-vs-all second order polynomial SVM classifiers can be trained, for example, using the SVMFu package or other suitable face classifier algorithm.

Height Classifier 235: Using a stereo camera pair allows for depth segmentation capabilities and allows measurement of distances to objects and their sizes, which is particularly useful in a mobile application. However, a single camera can be used as well, where the camera is calibrated for a particular static application. In any such cases, the true height of a person can be calculated from the vertical extent and the position of the bottom of the bounding box in the camera image. Calibration provides access to intrinsic parameters, A (focal length and principal point), as well as extrinsic parameters R and t, which define rotation and translation of the camera coordinate system with respect to some known position in the scene. With these, the imaging relation for the camera system is given by the following: $\hat{m}=A[R|t]M$, where M is the 3D coordinate of the imaged point, and $\hat{m}$ is the vector of homogeneous coordinates of the point in the image plane. To invert this relation, additional constraints can be used which assume that a) the person is standing on the floor; and b) the person's body is vertical. The height of the person can be computed by solving a system of linear equations for two image points—at the top and at the bottom of the bounding rectangle: $M=R^{-1}(A^{-1}\tilde{m}-t)$ subject to the ground plane constraints. The bounding box correction can also be applied due to camera roll, as well as ground plane correction due to estimation errors in the image-ground homography parameters. From these estimates, a single Gaussian density per person can be calculated from all training images where the person is observed, which is subsequently used for classification. Other known techniques for estimating height can be used as well.

Clothing Classifier 240: Individual clothing preferences can be captured by way of separate upper and lower body histograms, under the assumption that, within a given day, individuals do not change their clothing. In one such embodiment, the histogram is computed from hue and saturation components of the person's shape in the image in the HSV color space. In one such case, 32 and 24 bins are allocated to the hue and saturation components, respectively. The person's silhouette is extracted from the image and the skin-colored pixels are removed as being non-discriminative. Then the image is split into upper and lower overlapping parts and hue and saturation histograms of both are built. Histograms are then labeled according to subject, and averaged by day so that for each day there are single upper and lower average histograms for each user. Collections of histograms for a given user are finally clustered using Kmeans (K=5), to give a clothing model including K prototypes. At classification time, the histogram calculated from the input image is compared to the stored models using normalized cross-correlation and the person is classified using the label of the Nearest Neighbor model. Other clothing classification techniques can be used as well.

In the combination of the classifier outputs, a binary critic, $\omega_\lambda$ (e.g., as discussed with reference to Equation 4) can be used. For each frame of the video sequence, a probability 0 is assigned to classifiers that do not observe their feature in the current frame. The rest of the classifiers are weighted equally. Additionally, a weight is applied to the face classifier proportional to the strength of the output of the face detector. Example results of running the vote, sum and product combination rules for direct and confidence-weighted classifier combination in accordance with an embodiment of the present invention are shown in FIGS. 6 and 7 of the previously incorporated U.S. Provisional Application No. 60/634,383.

The system described herein can be implemented in a number of processing environments. In one example, the system is implemented using the Parallel Virtual Machine library version 3.4.3, which allows for seamless integration of multiple machines of varied architectures into a large scale virtual machine. Modules (e.g., combination module or other weighting and combiner means, classifiers, and feature extractors) of identification system can be implemented, for example, in software (e.g., C, C++, or other object-oriented instruction set). In the example implementation, the combination module 260 ran on a dual processor (e.g., Pentium 4 1.3 GHz or better) computer running Windows XP (or other suitable operating systems, such as MAC OS or Linux OS) at fifteen frames a second. Other suitable processing environments will be apparent in light of this disclosure, and will depend on particulars of the desired application (e.g., complexity of feature streams, desired fps, and desired implementation costs). In addition to audio and video capture, managing the virtual machine, and database operations, the host system can also run all feature extractors. Individual classifiers (e.g., also implemented in software) can execute on separate machines of similar configurations, although in one particular configuration, the speaker classifier machine runs on a Linux OS machine for ease of implementation. Again, numerous suitable processing environments (including operating systems) can be used, and the present invention is not intended to be limited to any particular one. As previously mentioned, the classification results were output at 15 fps and were available at about 98% of the time when the target entity (e.g. person) was present in the "view" of the system (including visual and/or auditory views).

Methodology

Performance of a combination scheme described herein can be measured on a set of trials, where a trial includes the following general steps: generate training, validation and test data; train the base classifiers; generate classifier ensembles; and calculate error rates.

Generate training, validation and test data: Training, validation, and test data can be generated using any number of conventional or custom techniques. In one particular case, all training and testing data can be extracted from the input streams (e.g., audio and/or images) automatically with no manual intervention. Some examples of the training and test data sets are shown in FIGS. 3 and 5 of the previously incorporated U.S. Provisional Application No. 60/63,997. The training data set can be, for example, synthetic data (e.g., computer modeled) or real image data (e.g., human faces), or a combination of synthetic and real image data. Synthetic data can be used to train classifiers, while real data can be used to test the classifiers. In another particular example implementation, the data sets are drawn from five 2-dimensional Gaussian densities with random means and covariances. The means are drawn from normal distribution N ($[0, 0]^T$, 3*I), while covariances are samples drawn from the Wishart distribution W(I, 3) (unit covariance, 3 degrees of freedom). One such example data set is shown in FIG. 2 of the previously incorporated U.S. Provisional Application No. 60/634,383.

Train the base classifiers: Assume 5-class classifiers are trained with confidence weighting, as described herein, although other classifier configurations (e.g., single and/or multi-class) can be implemented, as will be apparent in light of this disclosure. The classifiers can be trained on both training and validation data sets. Alternatively, the classifiers can be trained on the training data set only, where the validation set is only used to calculate confusion matrices. In one particular embodiment, a set of N individual weighted component classifiers are trained. The training data used to train the classifiers is split 90%-10% (other embodiments can use different percentages, as will be apparent in light of this disclosure). In more detail, each classifier is trained on the 90% subset of the training data. Then, confidence is computed on the remaining 10% of the training data. After the test data is classified, the scores are weighted by the resulting distribution (Equations 3 or 4 from above). The resulting outputs can then be combined with a combination strategy, such as voting, product or sum. Assume the classifiers are implemented as SVMs with a polynomial kernel of degree 2. The classifiers can be trained and tested using, for example, the SVMFu package.

Generate classifier ensembles: An ensemble can be generated, for example, by random perturbation of the means of the classifiers. Other techniques for generating classifier ensembles will be apparent in light of this disclosure.

Calculate error rates: Evaluation of the performance of ensembles is performed on the test data set, As previously explained, using a confidence-based weighting scheme that operates on a "per-class" basis, rather than (or in addition to) the traditional "per-classifier" basis improves the identification system performance. Given a set of classifier scores (posterior probabilities), a threshold can be varied within the full range of posteriors rejecting samples for which the scores fall below the threshold. The error rate can be computed for the remaining points and plot it against their fraction in the data set. The test data set can be created by taking images and/or audio of the target entities (e.g., people, objects, etc) with appropriate recording equipment, as previously discussed (e.g., microphone, camera, and corresponding recorders). Adding a subset (e.g., 10%) of the test set to the training data, and evaluating the retrained systems on the remaining subset (e.g., 90%) of the original test set lead to a significant improvement in recognition rates, as compared to conventional weighting techniques. In addition, recomputing the weights of the classifiers on a subset (e.g., 10%) of the test data set, and not retraining the component classifiers also provided improved performance. Thus, retraining the classifiers on the enlarged training data set (e.g., training data set plus a subset of the subject test data set, such as real face images for training a face classifier or other subject test data) improves performance of the identification system. Also, recomputing the weights of the classifiers, while keeping the component classifiers unchanged also improves performance. Thus, a confidence-based weighting algorithm as described herein can be used, for example, to perform on-line learning in applications in which retraining of all classifiers is too time consuming or not possible.

Figure 6:
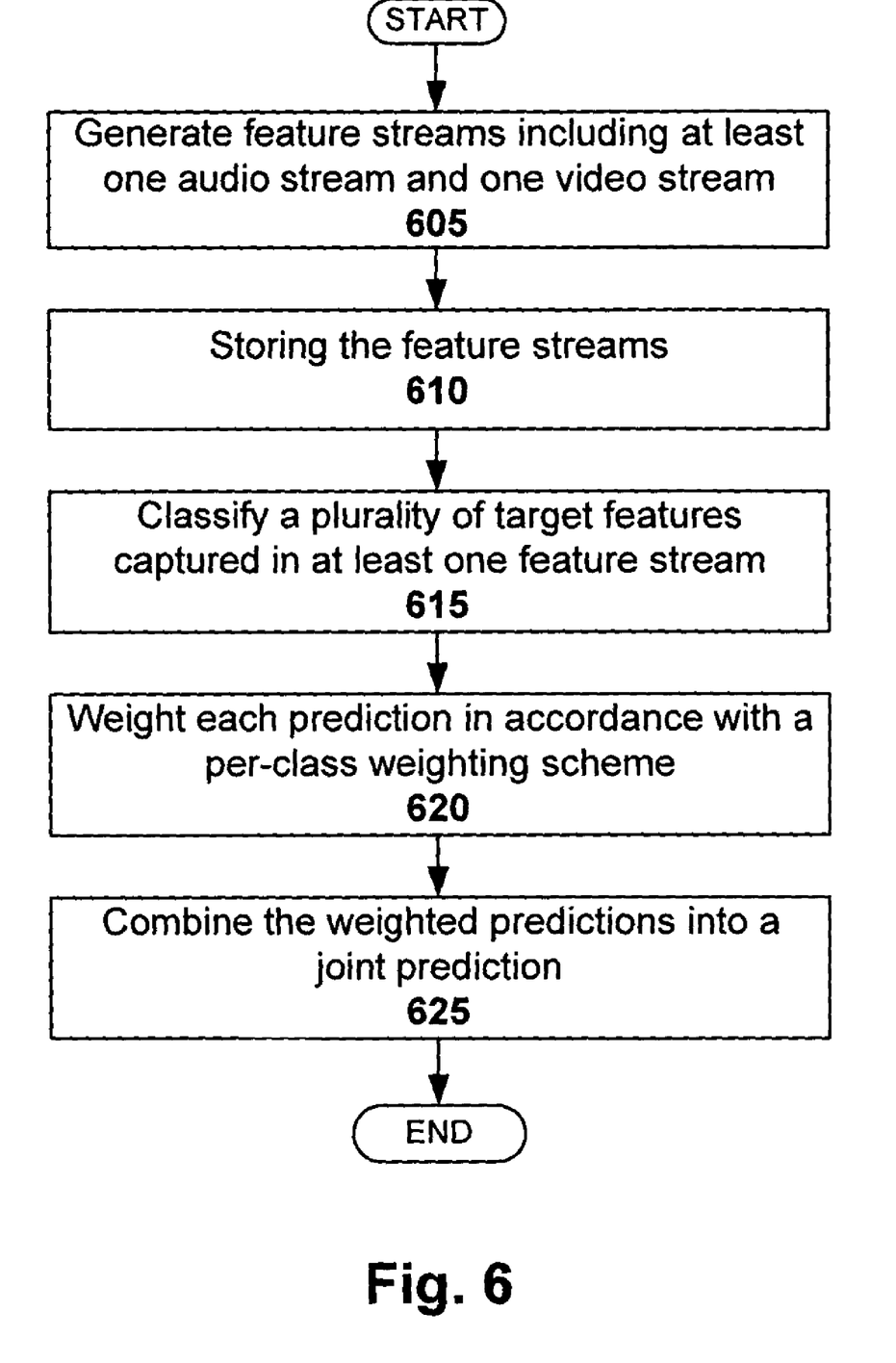
FIG. 6 illustrates a method for performing confidence weighted classifier combination for multi-modal identification, in accordance with an embodiment of the present invention.

FIG. 6 illustrates a method for performing confidence weighted classifier combination for multi-modal identification, in accordance with an embodiment of the present invention. The method can be carried out, for example, by the system discussed in reference to FIGS. 2 through 5. As previously explained, functionality of the system can be implemented in software executing in a suitable processor environment. However, other embodiments can be implemented in hardware (e.g., using gate-level logic or an ASIC), firmware (e.g., microcontroller configured with I/O capability for receiving data feeds from microphone and/or camera, and a number of routines for carrying out feature extraction, classification, confidence-based weighting, and combining as described herein).

The method includes generating 605 a number of feature streams, including at least one audio stream and one video stream. Alternatively, the generated features streams can be video or audio only. Numerous feature types can be classified by embodiments of the present invention, whether derived from video (or other graphical imagery) and/or audio.

The method continues with storing 610 the feature streams (e.g., in a database). As previously explained, a database system can be employed for generating and storing (for each feature stream) a record including at least one of a time stamp, a file name, recording conditions, and current system parameters in the storage. The method continues with classifying 615 a plurality of target features captured in at least one of the feature streams. Numerous classification techniques can be used here to generate predictions or target entity identity.

The method continues with weighting 620 each prediction in accordance with a per-class weighting scheme, as previously described. In one particular embodiment, a classifier is trained on a subset of training data, and then a confidence measure can be computed based on the remaining subset of the training data. In this case, the per-class weighting scheme (e.g., carried out by the combination module 260) includes weighting the classifier output by the resulting confidence measure. In any such cases, the method may continue with combining 625 the weighted predictions into a joint prediction, which can be used to identify target entities included in the feature streams, whether those entities are people, objects, or events.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A multi-class classifier combination system comprising:
   at least one processor;
   a plurality of multi-class classifiers, each classifier executing on one of the at least one processor, each classifier for classifying a target feature captured in at least one feature stream; and
   a combination module for combining classifier outputs into a joint prediction, wherein each multi-class classifier prediction is weighted in accordance with a per-class weighting scheme prior to combining, wherein the per-class weighting scheme carried out by the combination module is in accordance with $$P_s \approx \sum_\lambda w_\lambda \left[ \sum_{\tilde{\omega}} P_\lambda(\omega \mid \tilde{\omega}) P_\lambda(\tilde{\omega} \mid x) \right],$$

where $P_S$ is the joint prediction, x is a set of features in a given scene, $P_\lambda(\tilde{\omega}|x)$ is the prediction of the individual classifier, $w_\lambda$ is a per-classifier weight, and confidence measure, $P_\lambda(\omega|\tilde{\omega},x)$, is approximated by its projection, $P_\lambda(\omega|\tilde{\omega})$, wherein $\omega$ is a true class label and $\tilde{\omega}$ is an output of an individual multi-class classifier.

2. The system of claim 1 further comprising:
   a labeling subsystem for labeling stored feature streams accessible to the system, in accordance with a user selected labeling scheme.

3. The system of claim 1 further comprising:
   a storage for storing feature streams; and
   a database manager for generating and storing for each feature stream a record including at least one of a time stamp, a file name, recording conditions, and current system parameters in the storage.

4. The system of claim 1 further comprising:
   a data logging subsystem for generating feature streams including at least one audio stream and one video stream from a target scene.

5. The system of claim 4 wherein the data logging subsystem includes a detector that triggers generation of feature streams in response to detecting a target entity being present in the target scene.

6. The system of claim 1 wherein a classifier is trained on a subset of training data, and then a confidence measure is computed based on the remaining subset of the training data, and the per-class weighting scheme carried out by the combination module includes weighting the classifier output by the resulting confidence measure.

7. The system of claim 1 wherein the per-class weighting scheme carried out by the combination module is based on using a confidence measure to weigh each classifier output, the confidence measure derived from a confusion matrix that represents an empirical value of the distribution of intrinsic error of the classifier on a given data set.

8. A method for multi-class classifier combination using predictions of a plurality of multi-class classifiers, the method comprising using a processor to perform the steps of:

weighting each multi-class classifier prediction in accordance with a per-class weighting scheme; and combining the weighted predictions from two or more multi-class classifiers into a joint prediction, wherein the per-class weighting scheme is in accordance with $$P_s \approx \sum_\lambda w_\lambda \left[ \sum_{\tilde{\omega}} P_\lambda(\omega \mid \tilde{\omega}) P_\lambda(\tilde{\omega} \mid x) \right],$$

where $P_S$ is the joint prediction, x is a set of features in a given scene, $P_\lambda(\tilde{\omega}|x)$ is the prediction of the individual classifier, $w_\lambda$ is a per-classifier weight, and confidence measure, $P_\lambda(\omega|\tilde{\omega},x)$, is approximated by its projection, $P_\lambda(\omega|\tilde{\omega})$, wherein $\omega$ is a true class label and $\tilde{\omega}$ is an output of an individual multi-class classifier.

9. The method of claim 8 further comprising:

storing feature streams; and generating and storing a record for each feature stream including at least one of a time stamp, a file name, recording conditions, and current system parameters in the storage.

10. The method of claim 8 further comprising the preliminary steps of:

generating feature streams including at least one audio stream and one video stream from a target scene;

classifying a first target feature captured in at least one feature stream using a first multi-class classifier; and classifying a second target feature captured in at least one feature stream using a second multi-class classifier.

11. The method of claim 10 wherein generating feature streams is triggered in response to detecting a target entity being present in the target scene.

12. The method of claim 8 wherein the per-class weighting scheme is based on using a confidence measure to weigh each classifier output, the confidence measure derived from a confusion matrix that represents an empirical value of the distribution of intrinsic error of the classifier on a given data set.

13. The method of claim 8 further comprising the preliminary steps of:

training at least one of the multi-class classifiers on a subset of training data; and computing a confidence measure based on the remaining subset of the training data;

wherein the per-class weighting scheme includes weighting the at least one classifier output by the resulting confidence measure.

14. A multi-class classifier combination system comprising:

a means for classifying a first target feature captured in at least one feature stream using a first multi-class classifier;

a means for classifying a second target feature captured in at least one feature stream using a second multi-class classifier;

a means for weighting each multi-class classifier prediction in accordance with a per-class weighting scheme;

a means for combining the weighted predictions from the first and second multi-class classifiers into a joint prediction, wherein the per-class weighting scheme is in accordance with $$P_s \approx \sum_\lambda w_\lambda \left[ \sum_{\tilde{\omega}} P_\lambda(\omega \mid \tilde{\omega}) P_\lambda(\tilde{\omega} \mid x) \right],$$

where $P_S$ is the joint prediction, x is a set of features in a given scene, $P_\lambda(\tilde{\omega}|x)$ is the prediction of the individual classifier, $w_{80}$ is a per-classifier weight, and confidence measure, $P_\lambda(\omega|\tilde{\omega},x)$, is approximated by its projection, $P_\lambda(\omega|\tilde{\omega})$, wherein $\omega$ is a true class label and $\tilde{\omega}$ is an output of an individual multi-class classifier; and a processor for executing the means for combining the weighted predictions from the first and second multi-class classifiers into a joint prediction.

15. A computer-readable medium encoded with instructions, that when executed by a processor, cause the processor to carry out a multi-class classifier combination process using predictions of a plurality of multi-class classifiers, the process comprising:

weighting each multi-class classifier prediction in accordance with a per-class weighting scheme; and combining the weighted predictions from two or more multi-class classifiers into a joint prediction, wherein the per-class weighting scheme is in accordance with $$P_s \approx \sum_\lambda w_\lambda \left[ \sum_{\tilde{\omega}} P_\lambda(\omega \mid \tilde{\omega}) P_\lambda(\tilde{\omega} \mid x) \right],$$

where $P_S$ is the joint prediction, x is a set of features in a given scene, $P_\lambda(\tilde{\omega}|x)$ is the prediction of the individual classifier, $w_{80}$ is a per-classifier weight, and confidence measure, $P_\lambda(\omega|\tilde{\omega},x)$, is approximated by its projection, $P_\lambda(\omega|\tilde{\omega})$, wherein $\omega$ is a true class label and $\tilde{\omega}$ is an output of an individual multi-class classifier.

16. A multi-class classifier combination system comprising:

at least one processor;

a plurality of multi-class classifiers, each classifier executing on one of the at least one processor, each classifier for classifying a target feature captured in at least one feature stream; and a combination module for combining classifier outputs into a joint prediction, wherein each multi-class classifier prediction is weighted in accordance with a per-class weighting scheme prior to combining, wherein the per-class weighting scheme carried out by the combination module is in accordance with $$P_P(\omega \mid x) = \frac{1}{Z} \prod_\lambda \left[ \sum_{\tilde{\omega}} P_\lambda(\omega \mid \tilde{\omega}) P_\lambda(\tilde{\omega} \mid x) \right],$$

where $P_P$ is the joint prediction using a product combination rule, x is a set of features in a given scene, $P_\lambda(\tilde{\omega}|x)$ is the prediction of the individual classifier, Z is a normalizing constant, and confidence measure, $P_\lambda(\omega|\tilde{\omega},x)$, is approximated by its projection, $P_\lambda(\omega|\tilde{\omega})$, wherein $\omega$ is a true class label and $\tilde{\omega}$ is an output of an individual multi-class classifier.

17. A method for multi-class classifier combination using predictions of a plurality of multi-class classifiers, the method comprising using a processor to perform the steps of:

weighting each multi-class classifier prediction in accordance with a per-class weighting scheme; and combining the weighted predictions from two or more multi-class classifiers into a joint prediction, wherein the per-class weighting scheme is in accordance with $$P_P(\omega \mid x) = \frac{1}{Z} \prod_\lambda \left[ \sum_{\tilde{\omega}} P_\lambda(\omega \mid \tilde{\omega}) P_\lambda(\tilde{\omega} \mid x) \right],$$

where $P_P$ is the joint prediction using a product combination rule, x is a set of features in a given scene, $P_\lambda(\tilde{\omega}|x)$ is the prediction of the individual classifier, Z is a normalizing constant, and confidence measure, $P_\lambda(\omega|\tilde{\omega},x)$, is approximated by its projection, $P_\lambda(\omega|\tilde{\omega})$, wherein $\omega$ is a true class label and $\tilde{\omega}$ is an output of an individual multi-class classifier.

18. A computer-readable medium encoded with instructions, that when executed by a processor, cause the processor to carry out a multi-class classifier combination process using predictions of a plurality of multi-class classifiers, the process comprising:

weighting each multi-class classifier prediction in accordance with a per-class weighting scheme; and combining the weighted predictions from two or more multi-class classifiers into a joint prediction wherein the per-class weighting scheme is in accordance with $$P_P(\omega \mid x) = \frac{1}{Z} \prod_\lambda \left[ \sum_{\tilde{\omega}} P_\lambda(\omega \mid \tilde{\omega}) P_\lambda(\tilde{\omega} \mid x) \right],$$

where $P_P$ is the joint prediction using a product combination rule, x is a set of features in a given scene, $P_\lambda(\tilde{\omega}|x)$ is the prediction of the individual classifier, Z is a normalizing constant, and confidence measure, $P_\lambda(\omega|\tilde{\omega},x)$, is approximated by its projection, $P_\lambda(\omega|\tilde{\omega})$, wherein $\omega$ is a true class label and $\tilde{\omega}$ is an output of an individual multi-class classifier.

* * * * *

UNITED STATES PATENT AND TRADEMARK OFFICE
CERTIFICATE OF CORRECTION

PATENT NO. : 7,742,641 B2 Page 1 of 1
APPLICATION NO. : 11/293465
DATED : June 22, 2010
INVENTOR(S) : Yuri Ivanov and Thomas R. Serre

It is certified that error appears in the above-identified patent and that said Letters Patent is hereby corrected as shown below:

Column 18, line 9, delete "$W_{80}$" insert -- $w_\lambda$ --.

Column 18, line 35, delete "$W_{80}$" insert -- $w_\lambda$ --.

Signed and Sealed this

Ninth Day of November, 2010

David J. Kappos
*Director of the United States Patent and Trademark Office*